United States Patent

[11] 3,615,767

[72] Inventors Alfred R. Conroy, Jr.
 Denver;
 William C. Bauer, Boulder; David D. Billings, Golden, all of Colo.
[21] Appl. No. 4,440
[22] Filed Jan. 20, 1970
[45] Patented Oct. 26, 1971
[73] Assignee FMC Corporation
 New York, N.Y.
 Continuation of application Ser. No. 542,714, Apr. 13, 1966, now abandoned.

[54] GLASS MANUFACTURE EMPLOYING SODIUM SULFITE
4 Claims, 3 Drawing Figs.

[52] U.S. Cl. .................................................. 106/52, 65/134
[51] Int. Cl. .................................................. C03c 3/04
[50] Field of Search ........................................ 106/52, 47; 65/134

[56] References Cited
UNITED STATES PATENTS

| | | | |
|---|---|---|---|
| R-26,328 | 1/1968 | Monks | 106/52 |
| 1,488,914 | 4/1924 | Gelstharp | 65/134 |
| 2,113,195 | 4/1938 | Flint | 106/52 |
| 2,220,750 | 11/1940 | Bair | 106/52 |
| 2,224,791 | 12/1940 | Loffler | 106/52 |
| 2,366,473 | 1/1945 | Bair | 106/52 |
| 2,481,151 | 8/1949 | Bair | 106/52 |
| 3,375,095 | 3/1968 | Poole | 65/134 |

FOREIGN PATENTS

| | | | |
|---|---|---|---|
| 643,438 | 0/1950 | Great Britain | 65/134 |

OTHER REFERENCES

Weyl, W.; The Glass Industry; Jan. 1943 pp. 17– 20 & 39.
Tooley, Handbook of Glass Manufacture; New York 1953 pp. 66.

*Primary Examiner*—Tobias E. Levow
*Assistant Examiner*—W. R. Satterfield
*Attorneys*—Eugene G. Seems, Frank Ianno and Milton Zucker ABSTRACT: Process of melting a glass batch in order to reduce the number and size of seeds which are present in the final glass product by adding a minor but effective amount, on the order of 0.015 to 1.8 percent by weight, of sodium sulfite to the glass batch charged to a glass furnace.

REFINING RATE OF GLASS BATCHES

| | BATCH COMPOSITIONS (WT.%) | | | |
|---|---|---|---|---|
| | 5 | 6 | 7 | 8 |
| $SiO_2$ | 58.95 | 58.95 | 58.96 | 59.00 |
| $CaCO_3$ | 19.05 | 19.05 | 19.05 | 19.10 |
| $Na_2CO_3$ | 21.41 | 21.40 | 21.38 | 21.30 |
| $Na_2SO_3$ | 0.03 | 0.06 | 0.15 | |
| $Na_2SO_4$ | 0.56 | 0.54 | 0.46 | 0.60 |
| LB/TON SAND | | | | |
| $Na_2SO_3$ | 1.00 | 2.00 | 5.00 | |
| $Na_2SO_4$ | 19.14 | 18.32 | 15.75 | 20.00 |

INVENTORS
ALFRED R. CONROY JR.
WILLIAM C. BAUER
DAVID D. BILLINGS

BUBBLE SIZE IN GLASS MELTS

[BUBBLE VOLUME (mm³) GRAM] vs TIME AT 2700° F (MINUTES)

| BATCH COMPOSITIONS (WT.%) | | |
|---|---|---|
| | 2 | 8 |
| $SiO_2$ | 59.01 | 59.00 |
| $CaCO_3$ | 19.06 | 19.10 |
| $Na_2CO_3$ | 21.49 | 21.30 |
| $Na_2SO_3$ | 0.44 | |
| $Na_2SO_4$ | | 0.60 |
| LB/TON SAND | | |
| $Na_2SO_3$ | 15.0 | |
| $Na_2SO_4$ | | 20.0 |

INVENTORS
ALFRED R. CONROY JR.
WILLIAM C. BAUER
DAVID D. BILLINGS

GLASS MANUFACTURE EMPLOYING SODIUM SULFITE

This application is a continuation of U.S. Application Ser. No. 542,714 filed Apr. 13, 1966, now abandoned.

This invention relates to the manufacture of glass and, more specifically, to an improvement in the melting step of a glass batch.

In the manufacture of glass the principal ingredients, soda, lime and silica, are mixed as homogeneously as possible and a batch of this mixture is charged into a furnace and heated until 42 these ingredients melt or fuse into a liquid of high viscosity. During this fusion, chemical reactions take place which result in the evolution of gases and the formation of bubbles in the melt Most of the gas bubbles rise upwardly in the viscous liquid and escape from the solution However, some remain and form gas inclusions or "seeds." These "seeds" are undesired in glass because they are unsightly and therefore aesthetically unappealing to the ultimate purchaser and, if present in excess, also weaken the glass structure.

In general, the melting operation of glass furnace is controlled to yield maximum glass tonnages with minimum gas inclusions at the lowest practical operating temperatures. It is therefore desirable to reduce or eliminate seeds in glass produced at standard temperatures and at a standard production rate. It is equally advantageous to produce higher tonnages of glass having the same seed count as regular production rate glass or to produce glass at reduced temperatures having the same seed count as regular production rate glass. The ultimate aim of the glass manufacturer is to produce more glass of an acceptably low seed ount in a given furnace, thereby boosting production without lowering quality, or to produce the same quality glass at lower temperatures, thereby reducing heating costs The technique for reducing the number of seeds in glass is termed "refining" (sometimes also termed "fining"). Various chemicals have been added to glass batches by manufacturers in order to hasten the refining process, these additives are known as "refining agents" and in general lower the seed level in a given glass melt Among the refining agents which have been used by prior workers are byproduct slag from a metallurgic furnace (preferably blast furnace slag) and alkali-metal sulfates or alkaline-earth metal sulfates. The use of blast furnace slag as a refining agent is described in detail in U.S. Pat. No. 3,150,991 issued on Sept. 29, 1964 to Joseph R Monks, Jr While these refining agents have been found effective, it has been desired to utilize more effective refining agents and to obviate some of the disadvantages of of these agents. For example, blast furnace slag is chemically nonhomogeneous as a function of its grain size Thus, segregation takes place in glass plant raw material feeds and mix-batch storage bins resulting in nonhomogeneous batches being fed to the glass furnace. Further, blast furnace slag contains metallic ions such as iron and manganese which can produce undesired coloring effects in flint (clear, white) glass.

It is an object of the present invention to provide more effective refining agents during the melting of glass which will reduce the seed level in the final glass.

It is a further object of the present invention to provide a method of melting glass which will permit the use of lower temperatures than those normally required to obtain dissolution of the glass batch.

These and other objects will be apparent from the following description.

We have now found that a silica glass batch can be melted in a glass furnace so that the number and size of the seeds in the final glass are reduced, by adding a minor but effective amount, on the order of 0.015 to 1.8 percent (and preferably 0.4 to 0.8 percent) by weight, of sodium sulfite to the glass batch charged to the furnace.

We have also found that the added sodium sulfite permits the glass batch to be melted more rapidly by promoting silica dissolution.

In carrying out the present invention a glass batch containing sufficient amounts of soda (sodium carbonate), lime (calcium oxide) and silica ($SiO_2$) and other components, e.g., feldspar dolomite, sodium sulfate, etc , in proportions well-known in the art to produce flint (clear, white), green container or plate glass is mixed with the required amounts of sodium sulfite until a homogeneous mixture has been obtained. The sodium sulfite can be present in amounts as little as 0.015 percent by weight, although best results are obtained at concentrations of from about 0.4–0.8 percent by weight. The homogeneous batch is then placed in a furnace and heated to temperatures of up to 2,640°–2,900° F In normal melting of glass batches when the temperature of the batch reaches about 1,560° F. Silica reacts with soda ash in the mix to form a solid sodium metasilicate composition. As the temperature is increased to about 1,900°–1,000° F. this solid metasilicate composition begins to melt and forms a viscous liquid The molten sodium metasilicate then commences to dissolve the remaining silica, lime and aluminous components with increases in temperatures until all of these components have been dissolved. Normally silica is the last component of the mix to be dissolved In the instant invention the presence of sodium sulfite results in the production of $SO_2$ gas in the melt commencing on the order of about 1650°F The $SO_2$ gas aids the refining process by helping to eliminate undesired gases such as carbon dioxide which are present in the melt. The evolution of $SO_2$ gases at this low temperature is not obtained with other additives present in the melt, e.g., sodium sulfate. The $SO_2$ gases create a stirring or agitation of the melt which helps in expelling the undesired gas bubbles on cooling.

The sodium sulfite additive also operates at temperatures commmencing from about 1,900° F. and above to sharply lower the viscosity of the melt This results in rapid increases in the dissolution of undissolved silica grains and ultimately results in increasing the rate of dissolution of the glass batch.

While there is no intent to be bound by any explanation or theory of operation it is believed that the presence of sodium sulfite operates as follows. As the melt is heated in the furnace to about 1,350° F. the sodium sulfite is believed to dissociate according to the following reaction:

I. 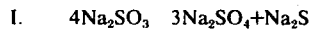 $4Na_2SO_3 \rightarrow 3Na_2SO_4 + Na_2S$

At approximately 1,380° F this mixture eutectically melts and wets the remaining batch particles. On further heating a reaction between sodium carbonate and silica sand commences with the melting of soda ash at approximately 1,560° F. This reaction produces sodium metasilicate, which remains in a solid state (melting point 1,900° F.). The sodium metasilicate cannot begin its important function of dissolving unreacted silica until the melt reaches a temperature of about 1,900° F. at which temperature the sodium metasilicate composition melts. However, at temperatures commencing from approximately 1,650° 14 F. the reaction products of the sodium sulfite dissociation, namely, sodium sulfate and sodium sulfide, react to form sodium oxide and sulfur dioxide in accordance with the following equation:

II. 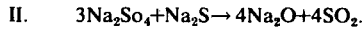 $3Na_2SO_4 + Na_2S \rightarrow 4Na_2O + 4SO_2$.

By the time the temperature of the batch has reached about 1,990° F., the above chemical reaction of the sodium sulfate and sodium sulfide is well along and in some manner causes a sharp drop in the apparent surface tension and the viscosity of that portion of the batch that has melted. As a result, mass transfer reactions in this highly fluid melt proceed at much greater rates than normally would occur resulting in rapid dissolution of undissolved (sand) silica grains.

In addition to the increase in fluidity of the melt caused by reaction II, the $SO_2$ which is released at these unusually low temperatures aids in mixing and agitating the liquid phase. Further, the presence of $SO_2$ in the melt at relatively low temperatures of 1,920°–1,990° F. initiates removal of other bubble producing gases from the melt much sooner than is normally the case, The $SO_2$ from gas aids in expelling these gases in part by aiding the formation and rise of the bubbles to the surface of the melt and in part by agitating the melt and facilitating movement of the bubbles to the melt surface.

In essence, the presence of sulfite in the batch permits it to be melted more rapidly because the sodium sulfite promotes silica dissolution, In addition, the lowering of surface tension and viscosity of the melt aided by the addition of $SO_2$ in the mix results in improved refining of the glass.

In carrying out the present invention the sodium sulfite refining agent can be used alone or in combination with sodium sulfate, However, sodium sulfite is more effective than sodium sulfate alone as a refining agent. Moreover, the sodium sulfite refining action proceeds in a different manner than that approximately the sodium sulfate. More specifically, when sodium sulfate is added to a glass batch and heated the sodium sulfate melts at APPROXIMATELY 1620° F. On further heating of the glass batch to about 1,900° F., at which temperature any sodium metasilicate in the batch melts, the sodium sulfate, unlike the sulfite refining agent, achieves no notable function in the melt. It is completely soluble in the molten metasilicate. The refining function of sodium sulfate commences only after the metasilicate has dissolved a quantity of silica sufficient to render the sulfate insoluble therein. At this point the insoluble sulfate separates from the melt and forms an immiscible liquid phase which acts as a surfactant in the melt, seeking out and adhering to all surfaces, including solid grains, gas bubbles, etc. The surfactant effect causes a high fluidity at the interfaces of the solid grains and gas bubbles, increases dissolution of the solid particles and speeds up the rise of the bubbles through the melt. In effect, it greases the bubbles and allows them to rise to the surface more rapidly and be expelled from the melt. At higher temperatures on the order of about 2,350°F. the immiscible sodium sulfate fluid begins to decompose and the decomposition products further aid in the refining process.

In effect, the use of both sodium sulfite and sodium sulfate results in an improved refining operation by two different mechanisms. The sodium sulfite produces $SO_2$ gas commencing at approximately 1,650° F. which aids in removing bubble producing gases from the melt, when the temperature reaches about 1,900° F. the sodium sulfite reduces the apparent surface tension and viscosity of the melt which produces rapid dissolving of the sand (silica grains). Thereafter as the temperature is increased and silica is dissolved in the liquid metasilicate phase, the sodium sulfate separates as an immiscible liquid phase an acts as a surfactant to aid in refining and in rapid dissolution of the solid particles of the batch. When a mixture of sodium sulfate and sodium sulfite are used as additives in a glass batch, as little as 5percent by weight of sodium sulfite present in the total amount of additives ($Na_2SO_4$ and $Na_2SO_3$) employed has been found to increase the dissolution rates.

The invention will now be illustrated by reference to the following drawings. In the drawings:

FIG. 1 defines a series of curves which illustrate the change in the seed content of glass that has been refined at 2,700° F. for specified amounts of time. FIG. 1 also defines the compositions of the glass batches and the results obtained when varying amounts of sodium sulfite were added to the glass batch.

The following example is given to illustrate the present invention and is not deemed to be limiting thereof.

EXAMPLE 1

A standard flint glass batch composition was made up containing 58.9 wt. percent silica sand, 19.0 wt. percent limestone and 22.1 wt percent soda ash. This batch yields a glass on cooling, absent additives, having the following approximate composition: 71.5 wt. percent $SiO_2$, 13.0 wt. percent $CaO$ and 15.5 wt. percent $Na_2O$. To this standard batch was added varying amounts sodium sulfite alone or in conjunction with sodium sulfate and the melting rate and the refining rate of the resulting glass batches were determined.

The melting rate determinations were carried out as follows. A number of 250 g. batches of the above basic composition were weighed out and mixed with 25 ml. of water in a laboratory mixer. The batches were mixed wet to assure homogeneity as well as to prevent segregation of the mix batch as samples were transferred to a hot stage microcrucible. Samples weighing 0.4 g. were transferred from each of the batches to platinum microcrucibles by means of a graduated tube sample. Each sample was dried in its crucible for 5 min. at 200° C. and thereafter the temperature was rapidly raised to 2,700° F. The temperatures increases were carried out on a Hot Stage Microscope of the type specified in U.S. Pat. No. 3,218,925 issued to James A. Robertson on Nov. 23, 1965. The samples were held at 2,700° F. under an air atmosphere until microscopic observation revealed that all solid batch particles had dissolved in the melt. The "batch free time" in minutes, that is the total time required to dissolve all batch particles measured from the instant the temperature rise to 2,700° F. was initiated, was then observed for the samples. A least four representative samples of each batch were tested in like manner to insure accurate results. The resulting "batch free time" is set forth in tables I and II along with the batch composition.

Figure 1:
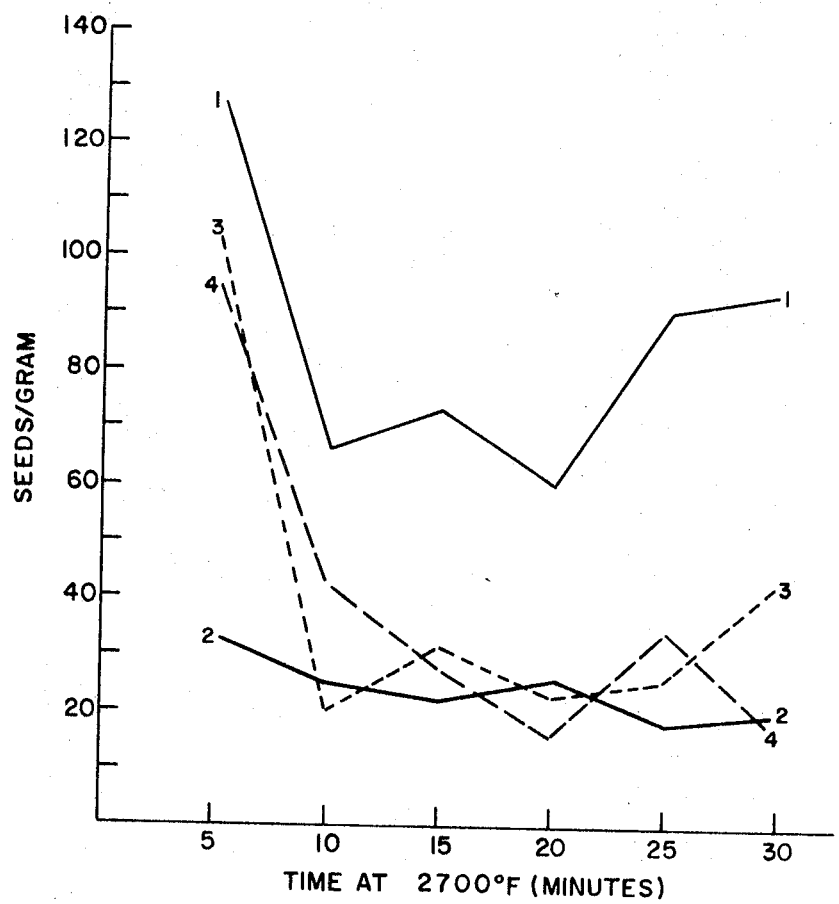
Figure 2:
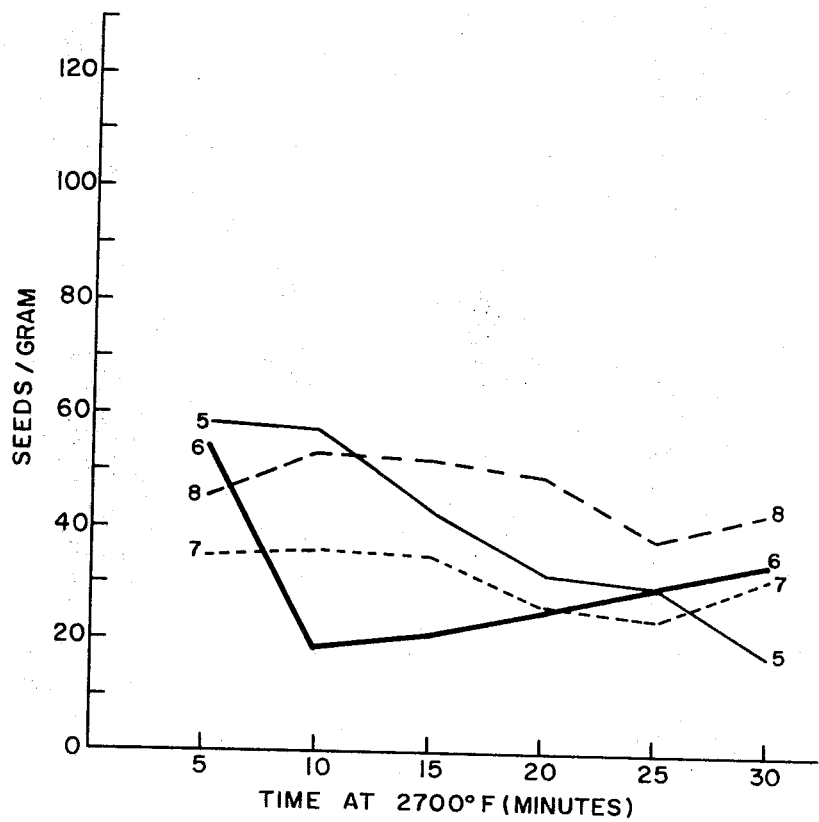
FIG. 2 illustrates a series of curves, like FIG. 1, which define the seed count except that mixtures of sodium sulfate and sodium sulfite were employed in the glass batch.
Figure 3:
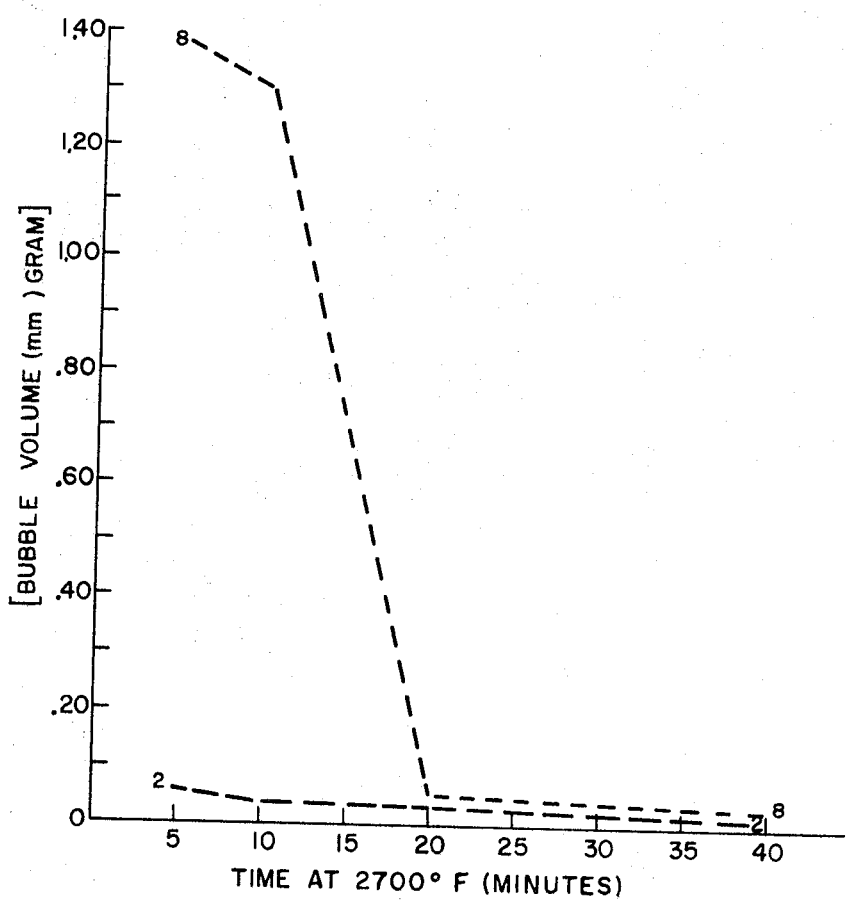
FIG. 3 illustrates two curves which define the bubble volumes in glass batches held at 2,700° F. for varying period of time in which sodium sulfite or sodium sulfate was added as the refining agent.

The refining rates of standard glass batches as set forth above containing various amounts of sodium sulfite alone or in conjunction with sodium sulfate were determined as follows: Samples of 50 g. of dry-mixed standard glass batches containing varying amounts of sodium sulfite alone or mixed with sodium sulfate were melted in fire clay crucibles at 2,700° F. under an air atmosphere in an electric muffle furnace. Each batch sample was placed in the muffle furnace at 2,700° F. and held at this temperature for periods of 5, 10, 15, 20, 25 and 30 minutes over and above the furnace recovery time; approximately 30 minutes was required for the furnace to recover to 2,700° F. after each group of samples was introduced. After the samples had been held at 2,700° F. for the required period of time they were removed and a glass button about 32 mm. in diameter and 10 mm. thick was poured from each melt. The glass buttons were annealed, cooled and weighed and the total number of bubbles (seeds) were counted under a low-power microscope. In addition the total bubble volume of the buttons was obtained by measuring the diameter of each bubble as it was counted and calculating the volume from the measured diameter (spherical shape was assumed). The total bubble volume for each sample was then divided by the weight of the sample to obtain the bubble volume per gram of glass. The refining rate is reported in FIG. 1 and 2 in terms of seeds per gram plotted against retention time, in minutes, at 2,700° F. along with the corresponding batch composition. The total bubble volume of the seeds is plotted against retention times, in minutes, at 2,700° F. in FIG. 3 of the drawings; the corresponding batch composition is also set forth in FIG. 3.

It is important to note that in the refining examples all batches containing sodium sulfite were completely melted after being held for 5 min. at 2,700° F., but that a batch which did not contain sodium sulfite required longer heating periods to melt completely.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

TABLE I

| Batch components (wt. percent): | Batch composition | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 59.04 | 59.04 | 59.03 | 59.03 | 59.01 | 59.01 | 58.99 | 58.96 | 58.93 | 58.88 | 58.90 | 59.00 |
| $CaCO_3$ | 19.08 | 19.07 | 19.07 | 19.07 | 19.07 | 19.06 | 19.06 | 19.05 | 19.04 | 19.02 | 19.00 | 19.10 |
| $Na_2CO_3$ | 21.87 | 21.86 | 21.83 | 21.75 | 21.63 | 21.49 | 21.36 | 21.10 | 20.85 | 20.32 | 22.10 | 21.30 |
| $Na_2SO_3$ | 0.015 | 0.03 | 0.06 | 0.148 | 0.296 | 0.442 | 0.59 | 0.88 | 1.18 | 1.77 | | |
| $Na_2SO_4$ | | | | | | | | | | | | 0.60 |
| $Na_2SO_3$ as lb./ton of sand | 0.5 | 1.0 | 2.0 | 5.0 | 10.0 | 15.0 | 20.0 | 30.0 | 40.0 | 60.0 | | [1] 20.00 |
| Batch free time (min.) | 27 | 25 | 25 | 23 | 21 | 16 | 17 | 17 | 21 | 23 | 32 | 19 |

[1] $Na_2SO_4$.

TABLE II

| Batch components (wt. percent): | Batch composition | | | | | |
|---|---|---|---|---|---|---|
| | 1 | 2 | 3 | 4 | 5 | 6 |
| $SiO_2$ | 58.90 | 59.00 | 58.95 | 58.95 | 58.96 | 59.01 |
| $CaCO_3$ | 19.00 | 19.10 | 19.05 | 19.05 | 19.05 | 19.07 |
| $Na_2CO_3$ | 22.10 | 21.30 | 21.41 | 21.40 | 21.35 | 21.49 |
| $Na_2SO_4$ | | 0.60 | 0.56 | 0.54 | 0.34 | |
| $Na_2SO_3$ | | | 0.03 | 0.06 | 0.30 | 0.44 |
| Lb./ton sand: | | | | | | |
| $Na_2SO_3$ | | | 1.00 | 2.00 | 10.00 | 15.0 |
| $Na_2SO_4$ | | 20.0 | 19.14 | 18.32 | 11.54 | |
| Batch free time (min.) | 32 | 19 | 17 | 17 | 17 | 16 |

What is claimed is:

1. In the process of melting a silica glass batch containing glass forming ingredients to form a final glass product wherein said batch is heated and melted at temperatures of from about 2,400° to about 2,900° F. the improvement which comprises adding to said batch about 0.015 to about 1.8 percent by weight of sodium sulfite whereby improved melting and refining are obtained.

2. Process of claim 1 wherein said sodium sulfite is added in amounts of 0.4 to 0.8 percent by weight of said glass batch.

3. Process of claim 1 wherein the principal ingredients of said glass batch consist essentially of soda, lime and silica and said glass product is colorless.

4. Process of claim 1 wherein sodium sulfate is added along with said sodium sulfite in effective amounts up to about 0.6 percent by weight of said glass batch.

* * * * *